United States Patent
Gong et al.

(10) Patent No.: US 8,086,455 B2
(45) Date of Patent: Dec. 27, 2011

(54) MODEL DEVELOPMENT AUTHORING, GENERATION AND EXECUTION BASED ON DATA AND PROCESSOR DEPENDENCIES

(75) Inventors: Yifan Gong, Sammamish, WA (US); Ye Tian, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1021 days.

(21) Appl. No.: 11/971,897

(22) Filed: Jan. 9, 2008

(65) Prior Publication Data
US 2009/0177471 A1 Jul. 9, 2009

(51) Int. Cl.
*G10L 15/12* (2006.01)
(52) U.S. Cl. ........ 704/242; 704/235; 704/250; 704/249; 704/256.2; 704/243; 718/104; 718/106; 705/7.36; 703/13
(58) Field of Classification Search .......... 704/235, 704/242, 251, 249, 231, 250, 243, 244, 256.2, 704/256; 718/104, 106; 705/7.36; 703/13
See application file for complete search history.

(56) References Cited

U.S. PATENT DOCUMENTS

| | | | | |
|---|---|---|---|---|
| 4,956,767 | A * | 9/1990 | Stephenson | 703/13 |
| 6,061,653 | A * | 5/2000 | Fisher et al. | 704/256.5 |
| 6,366,882 | B1 * | 4/2002 | Bijl et al. | 704/235 |
| 6,839,724 | B2 * | 1/2005 | Manchanda et al. | 707/625 |
| 6,849,045 | B2 | 2/2005 | Iliff | |
| 6,941,264 | B2 * | 9/2005 | Konopka et al. | 704/243 |
| 7,093,259 | B2 * | 8/2006 | Pulsipher et al. | 718/106 |
| 7,137,126 | B1 | 11/2006 | Coffman et al. | |
| 7,184,994 | B2 * | 2/2007 | Bella et al. | 706/49 |
| 2001/0032074 | A1 | 10/2001 | Harris et al. | |
| 2002/0103776 | A1 * | 8/2002 | Bella et al. | 706/49 |
| 2003/0036903 | A1 * | 2/2003 | Konopka et al. | 704/249 |
| 2003/0115066 | A1 | 6/2003 | Seeley et al. | |
| 2003/0120710 | A1 * | 6/2003 | Pulsipher et al. | 709/106 |
| 2005/0028133 | A1 * | 2/2005 | Ananth et al. | 717/105 |
| 2005/0114129 | A1 | 5/2005 | Watson et al. | |
| 2005/0251390 | A1 * | 11/2005 | Catchpole | 704/242 |
| 2006/0122833 | A1 | 6/2006 | Quibria et al. | |
| 2006/0241992 | A1 * | 10/2006 | Yaskin et al. | 705/8 |
| 2007/0005354 | A1 | 1/2007 | Potter et al. | |
| 2007/0123223 | A1 | 5/2007 | Letourneau et al. | |
| 2007/0124733 | A1 * | 5/2007 | Bril et al. | 718/104 |
| 2007/0179828 | A1 * | 8/2007 | Elkin et al. | 705/8 |
| 2007/0244703 | A1 | 10/2007 | Adams et al. | |
| 2007/0283358 | A1 * | 12/2007 | Kasahara et al. | 718/104 |
| 2009/0007127 | A1 * | 1/2009 | Roberts et al. | 718/104 |
| 2010/0205120 | A1 * | 8/2010 | Zou et al. | 706/12 |

OTHER PUBLICATIONS

Pargellis, et al., "Automatic Application Generator Matches User Expectations to System Capabilities", ESCA Workshop on Interactive Dialogue in Multi-Modal Systems (IDS-99), Jun. 22-25, 1999.

(Continued)

*Primary Examiner* — Vijay B Chawan
(74) *Attorney, Agent, or Firm* — Turk IP Law, LLC

(57) ABSTRACT

A recognition (e.g., speech, handwriting, etc.) model build process that is declarative and data-dependence-based. Process steps are defined in a declarative language as individual processors having input/output data relationships and data dependencies of predecessors and subsequent process steps. A compiler is utilized to generate the model building sequence. The compiler uses the input data and output data files of each model build processor to determine the sequence of model building and automatically orders the processing steps based on the declared input/output relationship (the user does not need to determine the order of execution). The compiler also automatically detects ill-defined processes, including cyclic definition and data being produced by more than one action. The user can add, change and/or modify a process by editing a declaration file, and rerunning the compiler, thereby a new process is automatically generated.

20 Claims, 10 Drawing Sheets

OTHER PUBLICATIONS

Yankelovich, et al., "SpeechActs: A Framework for Building Speech Applications", AVIOS '94 Conference Proceedings, Sun Microsystems Laboratories,Inc.1994.

Toth, et al., "Towards every-citizen's speech interface: an application generator for speech interfaces to databases" Seventh International Conference on Spoken Language, 2002.

* cited by examiner

EXAMPLE DECLARATION FOR A
SINGLE PROCESSING STEP

<identifier> '[' <attributes> ']' ':'
'(' '<a b c ...>' ')'
'(' '<i j k ...>' ')'
'[algorithm]' where <a b c ...> is input data, including data to be converted and control parameters, <i j k ...> is output data, and 'algorithm' defines operations for generating output data from the input data.

*FIG. 4*

MODEL DEVELOPMENT AUTHORING, GENERATION AND EXECUTION BASED ON DATA AND PROCESSOR DEPENDENCIES

BACKGROUND

Speech recognition model development processes involve performing a large number (e.g., 100) of processing steps. Each step is implemented by a processor that creates one or more outputs based on the consumption of inputs, which are the outputs of other processor steps. A problem is to decide which step is to be performed next. The process can be divided into several phases such as planning in which human experts define high-level tasks of the model development, modeling in which software programs perform data processing and build the models and model tuning in which a number of modeling parameters are tested in order to optimize speech recognition performance.

A current planning phase requires the manual specification of the "predecessors" for each task. The author has to manually order the tasks to ensure that all inputs are prepared before executing a task. When there are a large number of tasks, creation and management of the plan then becomes unreliable.

The modeling phase currently is implemented as rigid (e.g., hard-coded) procedural software. The work-flow is controlled by predesigned switches that determine the sequence of model building actions (e.g., configuration files).

The tuning phase currently is also implemented as rigid procedural software. In this phase, based on the intermediate data files or parameters that are tuned, some processes (and only those processes) must be activated. Since the work-flow is controlled by predesigned switches, it becomes difficult to satisfy the requirement by changing the code.

This approach has several limitations. By design the developer has control over which step to perform or not to perform by turning on/off switches in a control file. Consequently, the subsequent steps are not codified in the process and there is no enforcement to complete all the steps. Moreover, to add new functionality or update to the tool, the whole training process has to be tested against regression. This is expensive and a principal reason why deploying new technology can be costly. Additionally, if the modeling process is interrupted, there is no mechanism to guarantee that the restart will perform only the needed steps without duplicated or missing steps. The tuning stage is more complex because once an input file or a configuration is changed, it is difficult to determine which components are affected and should be rebuilt. Finally, there is no automatic way to know how many sub-components will be affected if one input is missing.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a recognition (e.g., speech, handwriting, etc.) model build process that is declarative and data-dependence-based. Rather than hard-coded pre-defined planning, training and tuning sequences, process steps are defined as individual processors having input/output data relationships and data dependencies of predecessors and subsequent process steps. A declarative language is provided that allows a user to declare each processing step, in terms of "action" (processor), "input data", "output data", "duration", and "resource". A compiler is utilized to generate the model building sequence. The compiler uses the input data and output data files of each model build processor to determine the sequence of model building and automatically orders the processing steps based on the declared input/output relationship (the user does not need to determine the order of execution). The compiler also automatically detects ill-defined processes, including cyclic definition and data being produced by more than one action. The user can add, change and/or modify a process by editing a declaration file, and rerunning the compiler, thereby a new process is automatically generated.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

FIG. 4 illustrates a declaration example for an elementary single processing step.

DETAILED DESCRIPTION

Figure 1:
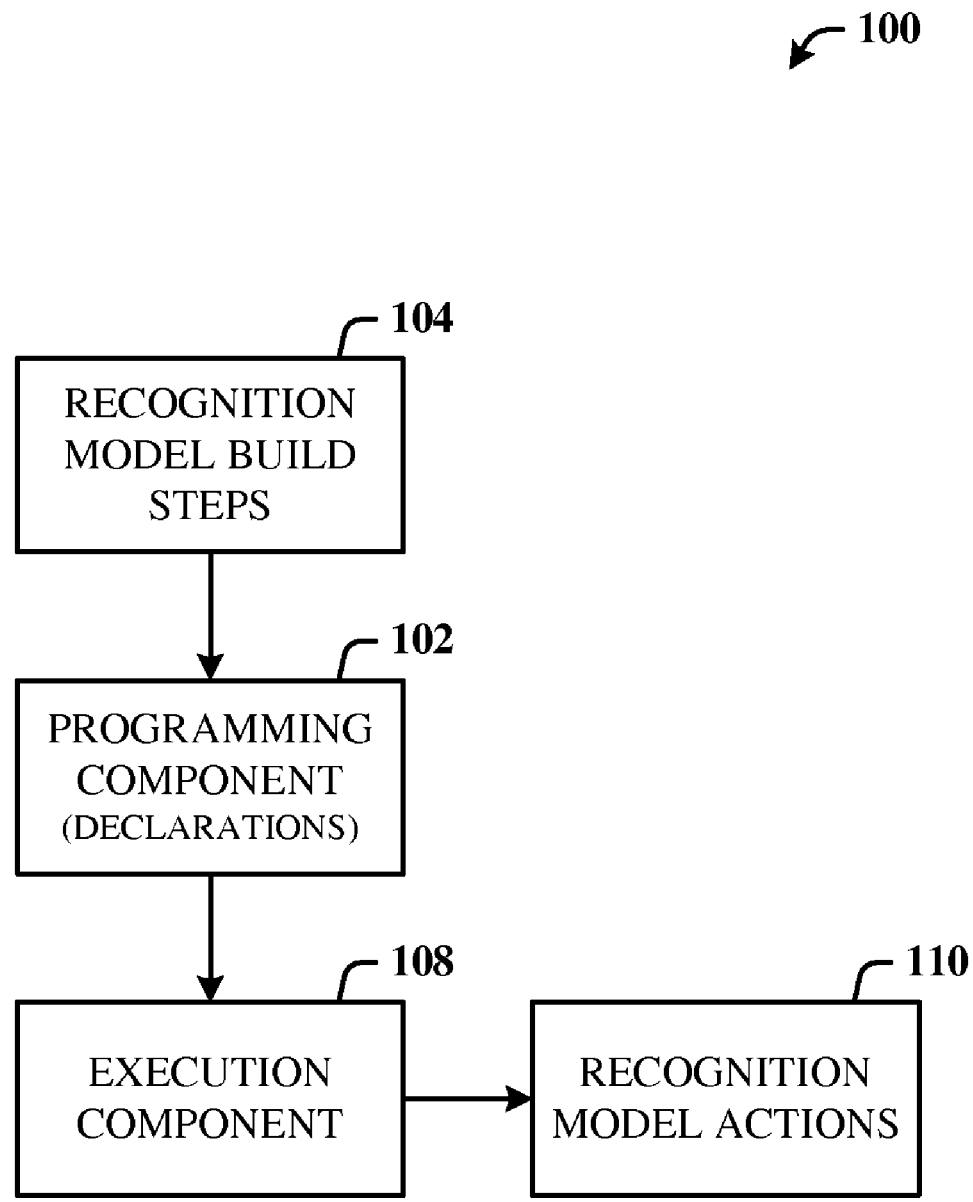
FIG. 1 illustrates a computer-implemented recognition model development system.

The disclosed architecture is a computational model that is declarative and utilizes data-dependency driven programming (referred to herein as 4D). The architecture finds particular application to complex data conversion problems involving intermediate data with complex dependencies and many processing steps. For example, the development of recognition models (e.g., speech, handwriting, character, language, etc.) for authoring, generation, and execution can obtain the benefit of the disclosed architecture. A process is defined by, for each processing step, the data dependencies and the input-to-output mapping. The architecture is declarative in a fundamental and basic way such that the end-user can do the programming, rather than requiring specialized employees or vendor involvement to do the programming.

For each step, all that is needed is the input data, the desired output data and a processor to process the input data to get the output data. The user does not need to describe the details of the orders processes.

The infrastructure includes a set of terminal processors that perform the step-wise conversion, a language that captures the dependencies, and a compiler (or other ordering component) that determines the process order for arriving at the desired output. The task description is defined using the 4D language to describe the processor, data, and control to generate the output data or results. The user explicitly declares the steps in terms of data input and output. The declaration includes the information leading to the determination of an order of steps, based on the dependencies of the data. For example, if processor P takes X as input and Y as output, then Y depends on X and P, and the processor that generates X will be executed before processor P. The solution derives the sequence of execution automatically based on the dependencies among the pieces of data. The processors perform data processing independently of other processors. The process generator takes the 4D language and the processors to generate a process graph. A graph interpreter executes the process based on the process graph and recursively applies the processor(s) to instantiate the data.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented recognition model development system 100. The system 100 includes a programming component 102 for defining recognition model build steps 104 as declarations of processors (or processing steps) and, input data (I) and output data (O) of the processors. The system 100 also includes an execution component 108 for ordering and executing the processors (or processing steps) based on the declarations to generate recognition model actions 110. The build steps 104 can be authored as declarations using the 4D declarative language, which the execution component 108 receives and processes into the model actions 110.

The language utilized in the programming component 102 allows an author to declare the input data and output data of each elementary processing step (a processor) in a recognition (e.g., speech) model development process of multiple processing steps. The declaration does not need to provide predetermined sequence of steps as in conventional procedural languages. Overall, the system 100 (and other systems described herein) facilitates the piece-wise specification of the model development process in which the elementary chunk is a rule defined by a processor, and the processor inputs and outputs. The framework automatically generates the sequence of recognition model development actions based on the declarations. By following the sequence, it is guaranteed that all the steps will have inputs available before being executed.

The system 100 also generates the predecessor steps (that are completed) of each step based on the declarations. As part of the system processes, a model development process graph is automatically generated showing the inputs and outputs of each of the steps. The steps are ordered as defined by data consumption relationships (data dependencies) described by the declarations. No manual programming work is involved for the ordering. All the model development data inputs of a process are verified to be available before executing the process. The system 100 also validates the consistency of the process based on the model development process declarations.

A generated sequence of actions is interpreted and any model development process described by the declaration can be implemented. Any arbitrary development process can be implemented without procedural changes via execution of a fixed set of steps and based on the declarations. Therefore no coding and testing is needed when the model development process declaration is changed. Moreover, recognition modeling processes do not need recoding and retesting when new processors are added, when the process is changed or extended, or when new events have occurred.

Figure 2:
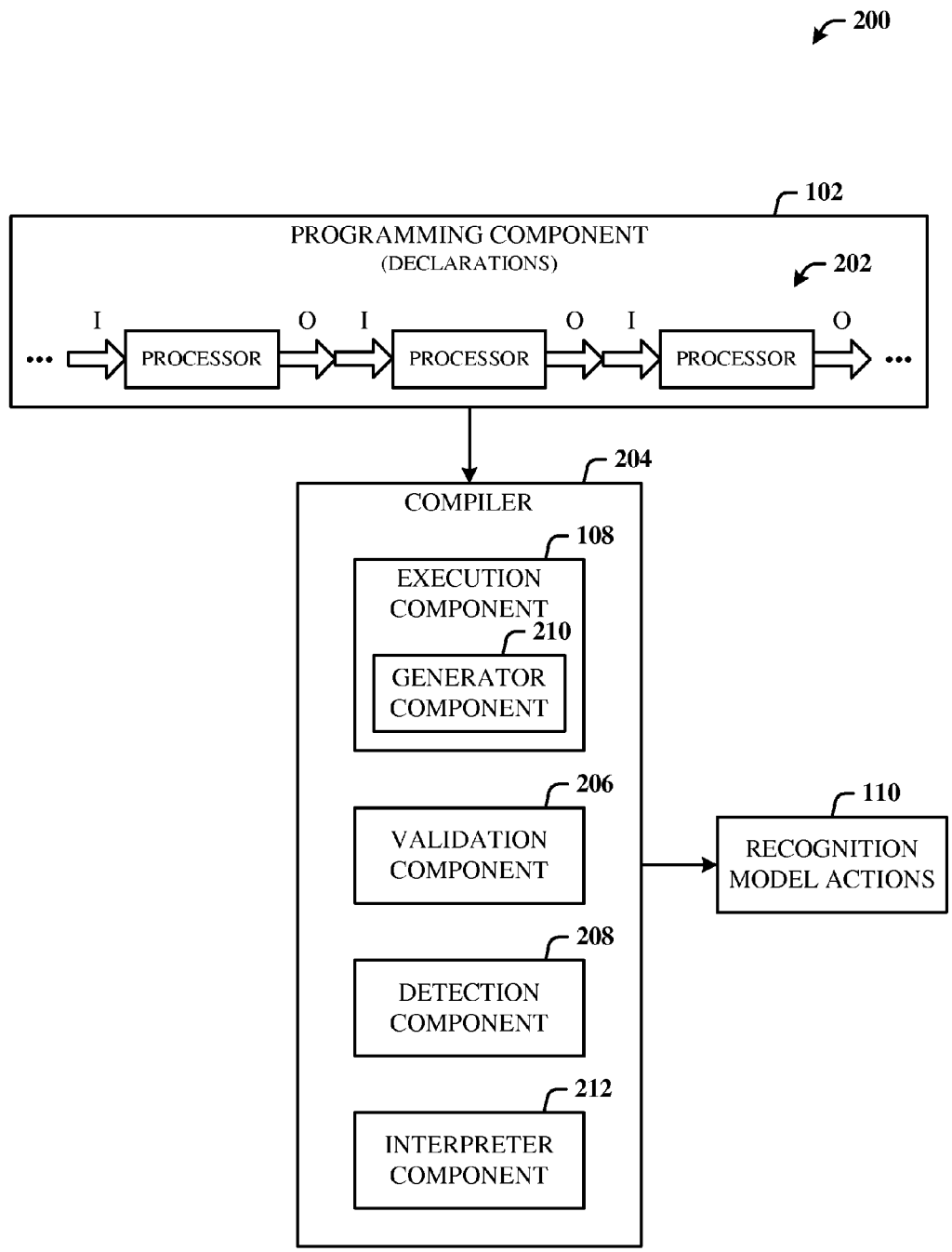
FIG. 2 illustrates an alternative computer-implemented recognition model development system.

FIG. 2 illustrates an alternative computer-implemented recognition model development system 200. The system 200 includes the programming component 102 for defining the recognition model (e.g., speech) build steps 104 of FIG. 1 according to a declarative language, each step defined as a processor (of multiple processors 202) having a data dependency and an input/output mapping, and the execution component 108 for executing the steps based on the ordered list of processors and generating the recognition model actions 110.

As previously indicated, the programming component 102 facilitates the declaration of a processor and processor input/output data as a task description. The task description includes variables constants, macro declarations, processors and data-dependencies (e.g., hierarchical with local variables) and deliverables (e.g., terminal recognition components). This allows the author of the model development process to describe, in a declarative language, each piece of data and the processing step to obtain the data. The final model development outcome (deliverables) is a set of such data. The declaration contains information on the model development process, which allows the determination of the order of execution.

The system 200 further includes a compiler 204 for the 4D language. Based on the model development task description, the compiler 204 generates an initial model development process graph. In this graph, any data or processor (of the processors 202) is represented as a node, and the edges represent the dependencies.

A validation component 206 is provided validating that a graph qualifies as a data-dependence graph. Not all the graphs may qualify as a data dependence graph. Qualifying graphs verify certain requirements such as data should not depend on more than one processor. A detection component 208 detects cyclic graphs, which means that in the declaration there is an item that is defined onto itself.

The execution component 108 can include a generator component 210 for automatically generating the ordered list of processors so that for any given processor, when the processor is executed, all of the processor input data is available. This generation process can be as follows: find the nodes with no exiting edges, record these nodes in the ordered action list, delete the edges going from any node to these nodes, and repeat, unless all nodes are recorded.

An interpreter component 212 is provided that has access of the ordered list of processors. The interpreter component 212 examines the dates of data and determines the next processor(s) to be executed based on the date(s). The execution stops when the dates of all the data are consistent across the system.

The system 200 includes a processor registration process which ensures that a processor declared in the task description file is known to the system. The processors of the recognition model development process can be existing tools, executables, and scripts written in various languages, one or more of which can be wrapped into a consistent interface for activation by the runtime process interpreter component 212.

Figure 3:
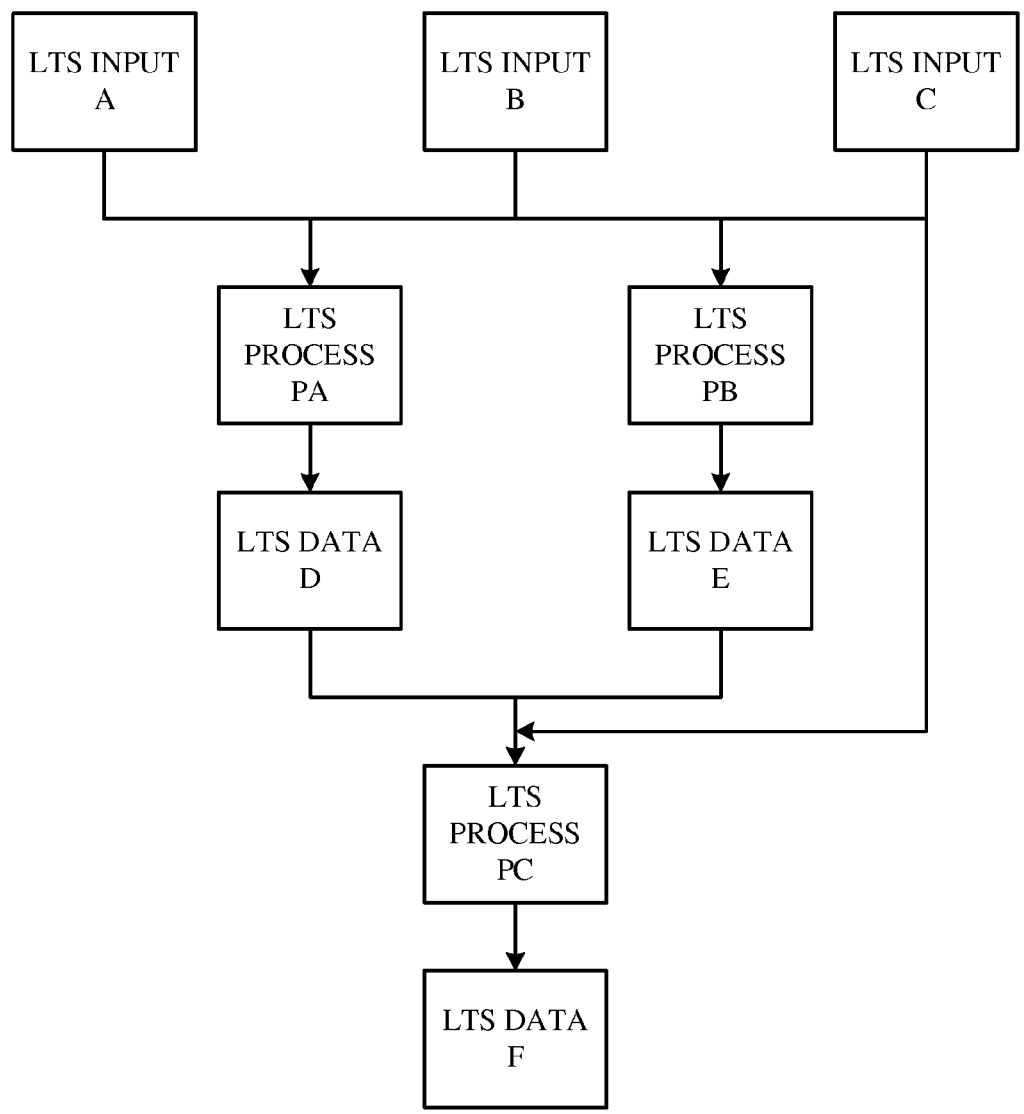
FIG. 3 illustrates an example of letter-to-sound model build for speech recognition.

FIG. 3 illustrates an example of letter-to-sound (LTS) model build 300 for speech recognition. Three inputs A, B and C (denoted LTS INPUT A, LTS INPUT B, and LTS INPUT C) provided for generating an output F. The inputs A, B and C are input to two processes: LTS PROCESS PA and LTS PROCESS PB. The respective outputs of the processes are LTS DATA D and LTS DATA E. These output data are then the input data to a third process LTS PROCESS PC, which outputs the LTS DATA F.

Conventional procedural code for the above processes could be the following:

```
If (A is missing, or B is missing)
        Report error;
    If (A is changed, or B is changed, or D does not exist)
    {
        call process PA
    }
Save the date and time of A and B
    If (B is missing, or C is missing)
        Report error;
    If (B is changed, or C is changed, or E does not exist)
    {
        call process PB
    }
Save the date and time of B and C
    If (D is missing, or E is missing, or C is missing)
        Report error;
    If (D is changed, or E is changed, or C is changed, or F does not exist)
    {
        call process PC
    }
Save the date and time of D and E
Output F
```

In contrast, following is a sample of declarations that can be employed to perform the same processes and obtain the same results.

```
                LTS process PA:
                (DATA A, DATA B, DATA C)
                (DATA D)
                [call process PA]
                LTS process PB:
                (DATA C, DATA B, DATA A)
                (DATA E)
                [call process PB]
                LTS process PC:
                (DATA D, DATA E, DATA C)
                (DATA F)
                [call process PC]
```

For example, Data D depends on DATA A and DATA B, and is generated by process PA. No manual programming is involved. The compiler will order the tasks based on the dependencies among the data.

Clearly, a considerable amount of additional code is required procedurally to describe which processes need to be re-executed when/if some input data is changed. Code is also required to see if the input files are ready. A tool is required to parse this code file and build a model graph. According to the graph, once a file is updated, the necessary process is automatically activated until the output is generated.

Comparing the above procedural code to the declarative code below, it is easy to see that the declarative code is much clearer and is easier to maintain by the end-user.

FIG. 4 illustrates a declaration example for an elementary single processing step 400. The sample declaration can be as follows:

```
                <identifier> '[' <attributes> ']' ':'
                '('<a b c ...>')'
                '('<i j k ...>')'
                '[algorithm]'
``` where <a b c . . . > is input data, including data to be converted and control parameters, <i j k . . . > is output data, and 'algorithm' defines the operations for generating the output data from the input data.

Figure 5:
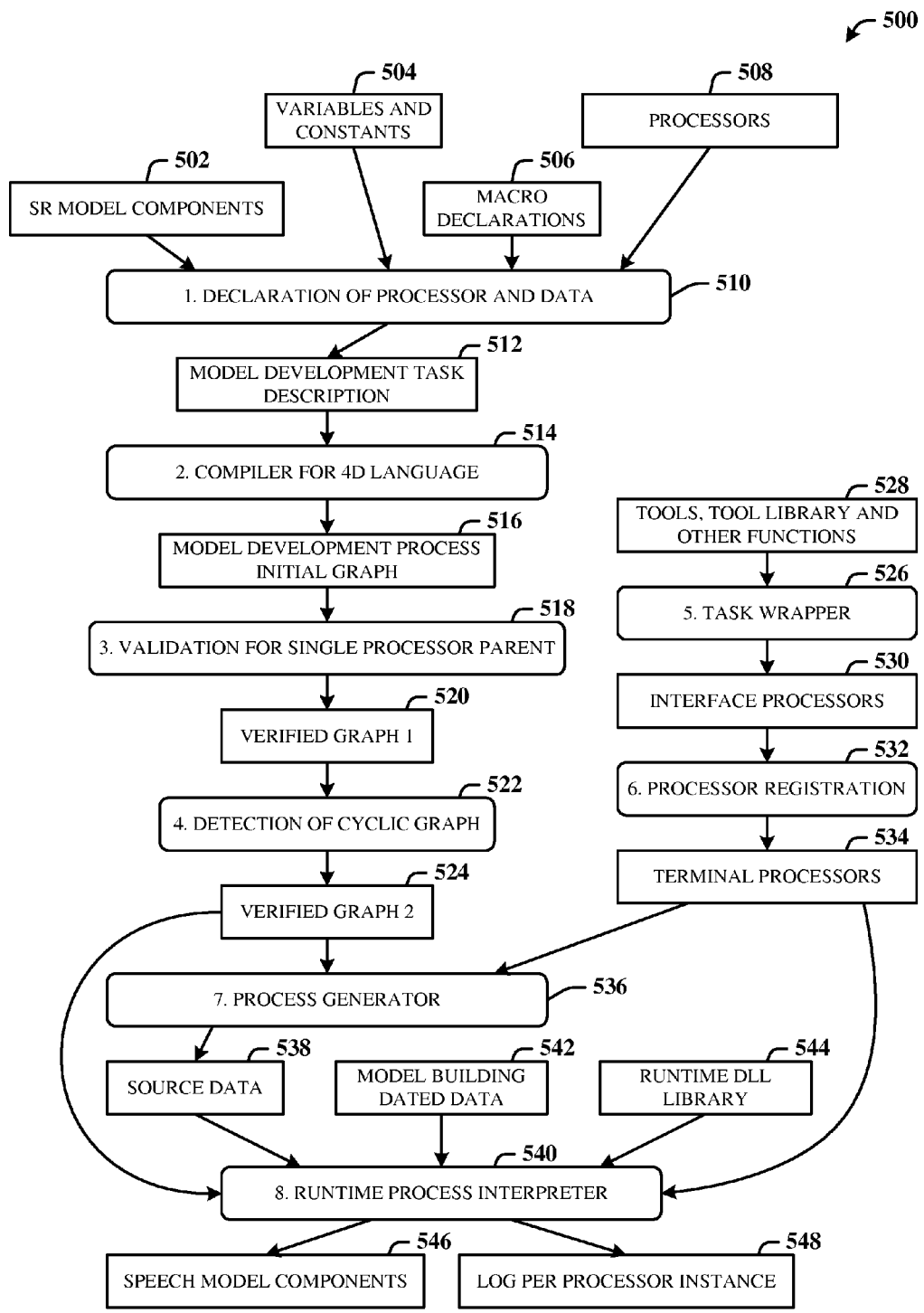
FIG. 5 illustrates a detailed flow diagram for generating speech model components for a speech recognition model build using a declarative framework.

FIG. 5 illustrates a detailed flow diagram for generating speech model components for a speech recognition (SR) model build 500 using a declarative framework. Although described in the context of a speech recognition model, it is to be understood that this also applies to other recognition model building such as handwriting recognition, for example. The build 500 begins inputting SR model components 502, variables and constant 504, macro declarations 506 and/or processors 508 (similar to processors 202 of FIG. 2) to a process 510 for declaration of the processor and input/output data. Output of the process 510 is a model development task description 512. The task description is in the 4D language and includes the variable and constants, macro declarations, processor(s), processor data, and controls for outputting new data (or results).

The model task description 512 is input to a 4D language compiler process 514 for compiling into an initial model development process graph 516. The initial graph is then validated 518 for all processors to ensure that each processor only has a single parent process. The validation process 518 creates a first verified graph 520. Next, a detection process analyzes the first verified graph 520 for cyclic processes (a process that refers back to itself). The output is a second verified graph 524 free of cyclic processes.

The build 500 also include a task wrapper 526 for wrapping tools, a tool library and other functions 528 for interfacing to processors 530. The processors of the speech model development process build 500 are existing tools, executables, and scripts written in various languages, which are wrapped into a consistent interface for activation by the run-time process interpreter. Processor registration 532 ensures that a processor declared in the task description 512 is known to the system. Terminal processors 534 are then created and input to a process generator 536, along with the second verified graph 524. The process generator determines logical dependencies between processors by exploring the data dependencies, applies formal methods, creates project files (in a project management application), and inserts a post-processor validation/check point. The methods include verifying type and data consistency (e.g., unspecified/over-specified data), ordering and parallelizing processors, and optimizing sequences. The project files can include schedules, linguist work and development and test work.

An output of the process generator 536 is the desired source data 538, which is passed to a runtime process interpreter 540. The interpreter 540 also receives model building dated data 542, access to a runtime DLL library 544, the second verified graph 524, and the terminal processors 534. Outputs of the interpreter 540 include the speech model components 546 and a log per processor instance 548.

Figure 6:
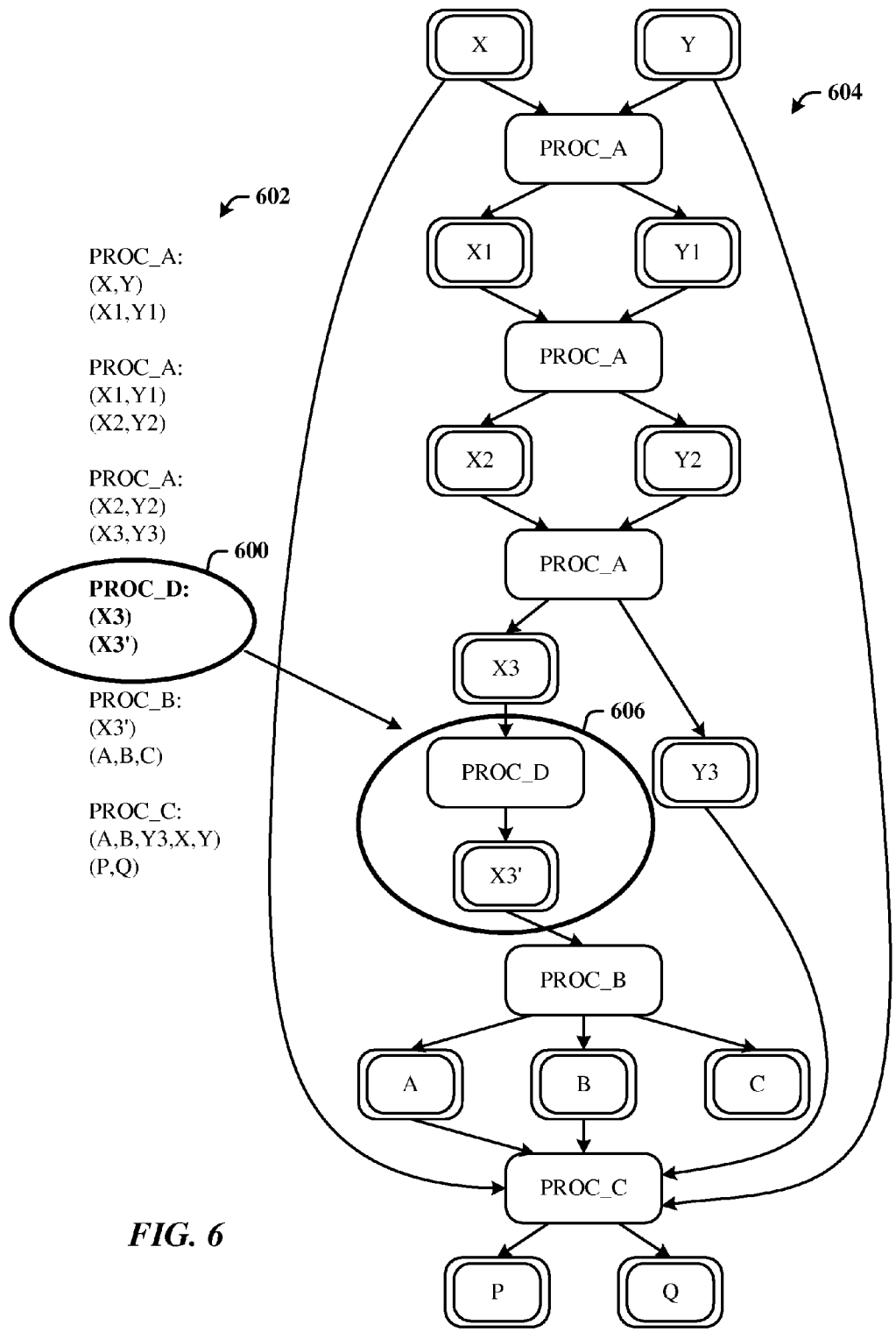
FIG. 6 illustrates an example of adding declarative code to existing declarative code for a new process and the associated changes to a directed graph.

FIG. 6 illustrates an example of adding declarative code 600 to existing declarative code 602 for a new process and the associated changes to a directed graph 604. The existing code includes the unbolded portions having the following process declarations and the new processor is the bolded declaration:

```
PROC_A:
(X,Y)
(X1,Y1)
PROC_A:
(X1,Y1)
(X2,Y2)
PROC_A:
(X2,Y2)
(X3,Y3)
            PROC_D:
            (X3)
            (X3')
PROC_B:
(X3')
(A,B,C)
PROC_C:
(A,B,Y3,X,Y)
(P,Q)
```

The corresponding directed graph 604 for the existing code excludes the circled portion 606. Adding the processor above in bolded code and the input/output data mappings causes the generation of the new process in the circled portion 606 of the direct graph 604. Thus, the simplicity for applying new processes is now available to the naive end-user. Moreover, rather than adding new processors, a process can be changed or extended, and/or adjustments made when new events occur.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
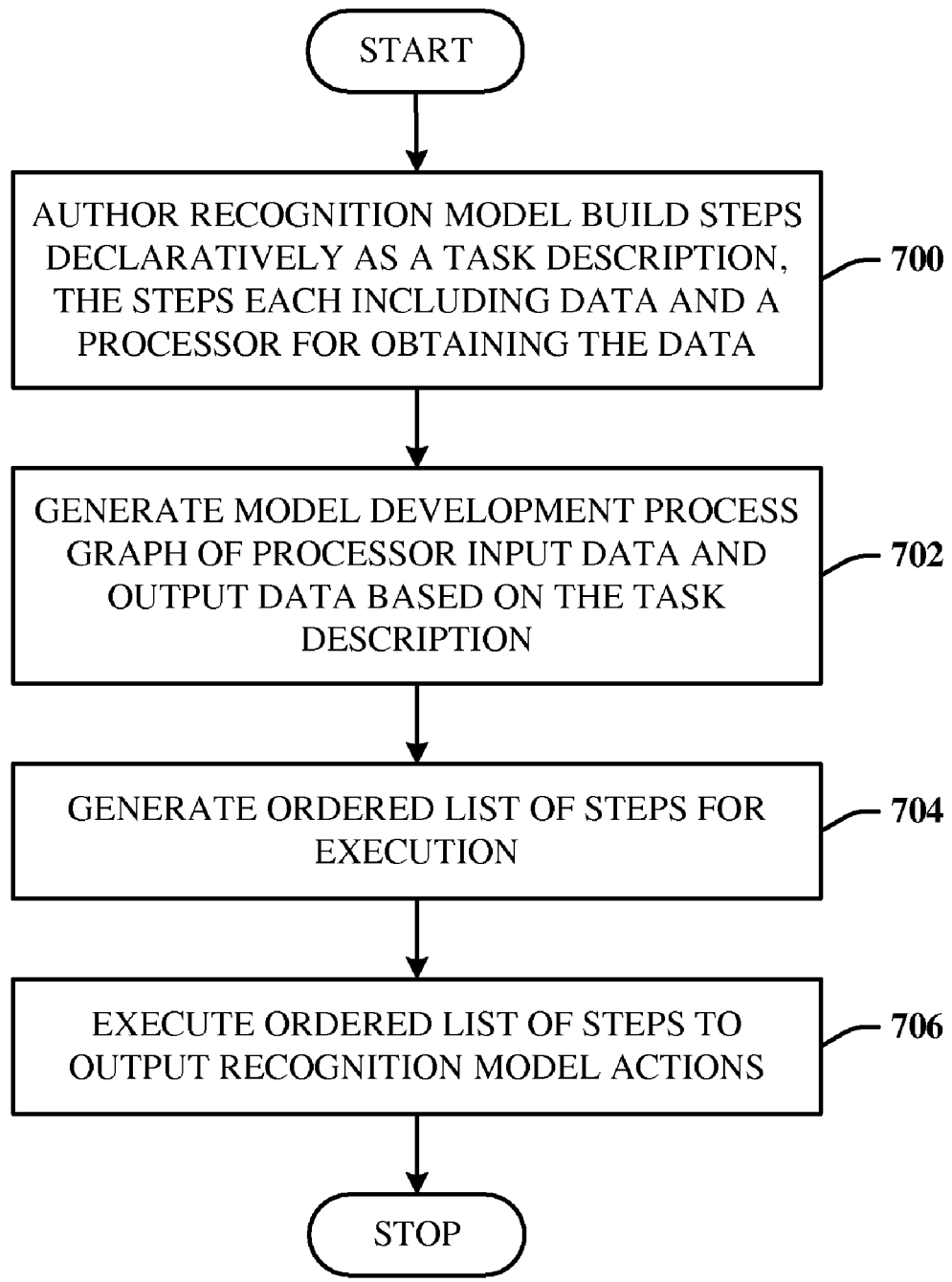
FIG. 7 illustrates a computer-implemented method of developing recognition models.

FIG. 7 illustrates a computer-implemented method of developing recognition models. At 700, recognition model build steps are authored declaratively as a task description, the steps each including data and a processor for obtaining the data. At 702, a model development process graph of processor input data and output data is generated based on the task description. At 704, an ordered list of the steps is generated for execution. At 706, the ordered list of steps is executed to output recognition model actions.

Figure 8:
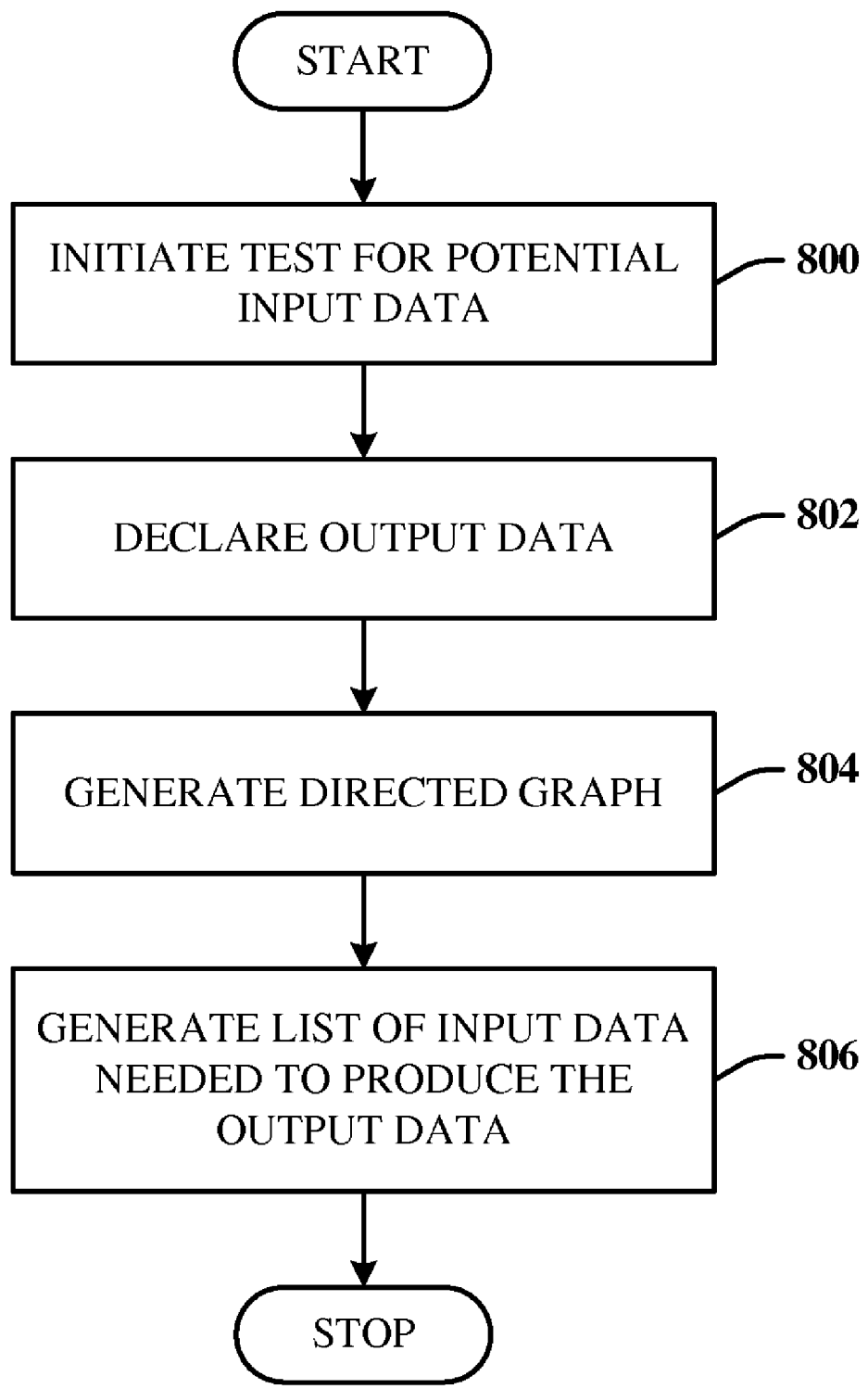
FIG. 8 illustrates a method of computing potential input data based on given output data.

The application can do, based on the task declaration and given a set of output data, deduce all inputs that are needed by the processors to produce the output data (without actually running the processors). FIG. 8 illustrates a method of computing potential input data based on given output data. At 800, initiate test for potential input data. At 802, declare output data. At 804, generate directed graph based on output data. At 806, generate list of input data needed to produce the output data.

Figure 9:
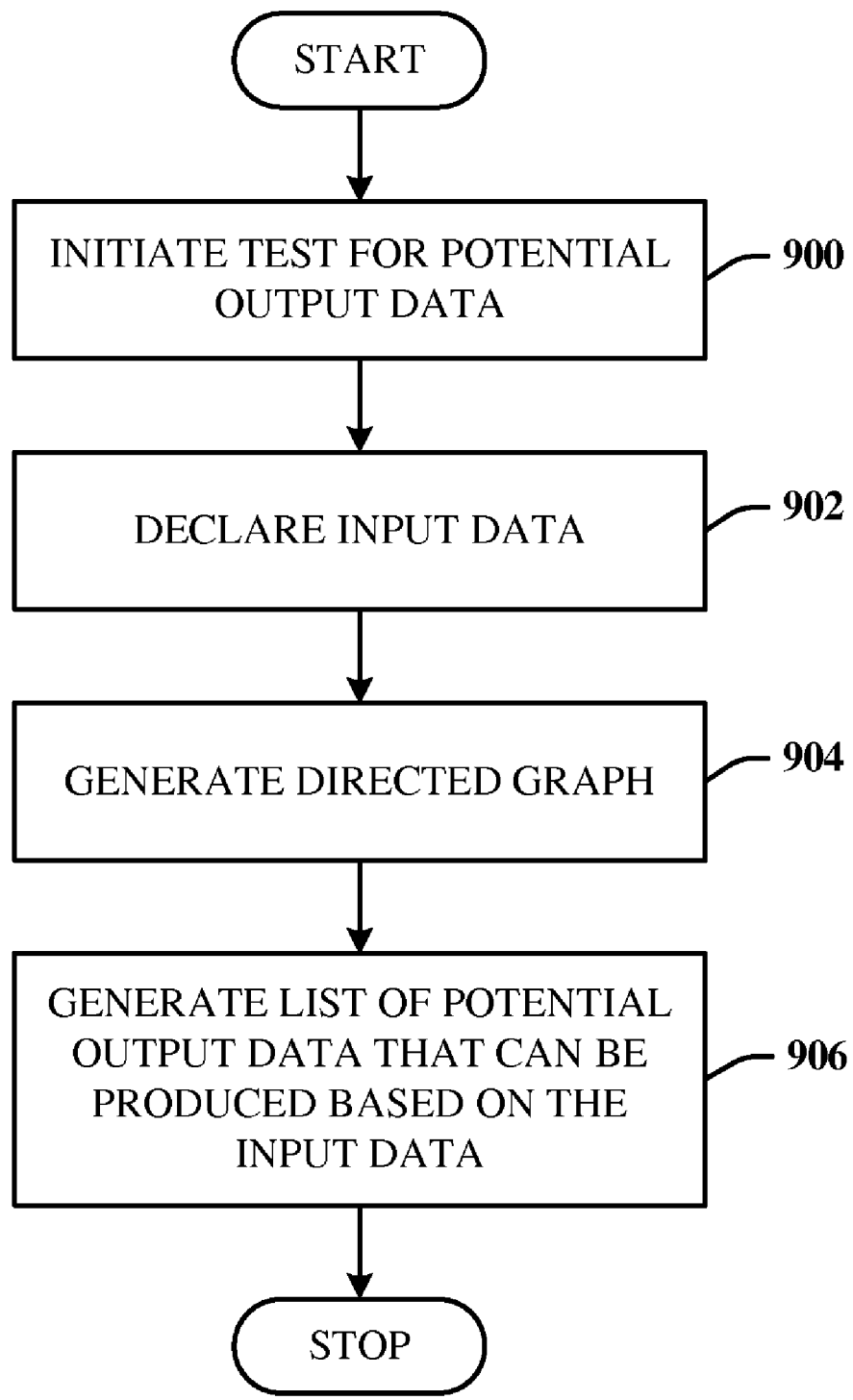
FIG. 9 illustrates a method of computing potential output data based on given input data.

The application can do, based on the task declaration and given a set of input data, deduce all possible output data that can be produced by the processors (without actually running the processors). FIG. 9 illustrates a method of computing potential output data based on given input data. At 900, initiate test for potential output data. At 902, declare input data. At 904, generate directed graph based on input data. At 906, generate list of potential output data that can be produced based on the input data.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
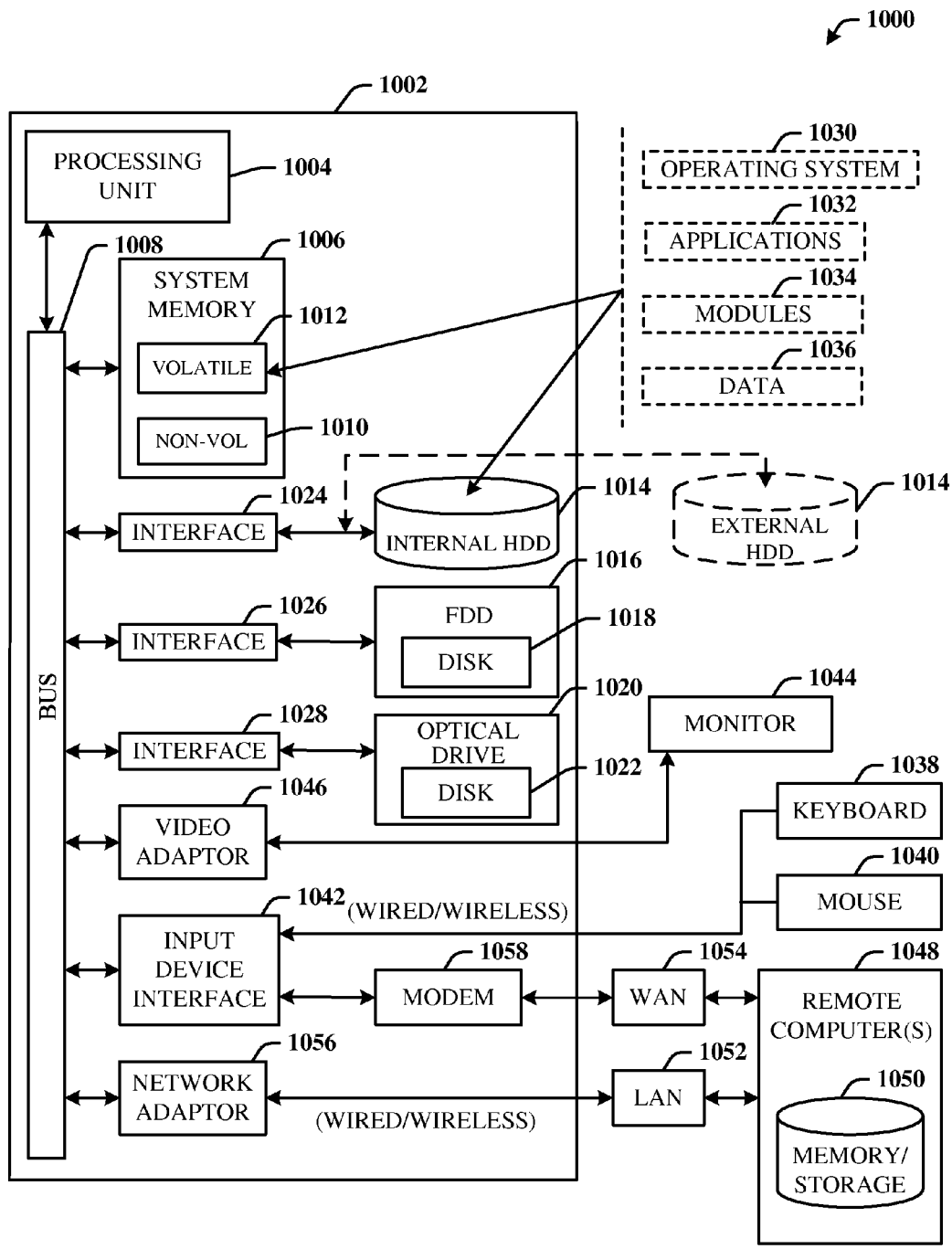
FIG. 10 illustrates a block diagram of a computing system operable to execute declarative recognition programming in accordance with the disclosed architecture.

Referring now to FIG. 10, there is illustrated a block diagram of a computing system 1000 operable to execute declarative recognition programming in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002 having a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 can include non-volatile memory (NON-VOL) 1010 and/or volatile memory 1012 (e.g., random access memory (RAM)). A basic input/output system (BIOS) can be stored in the non-volatile memory 1010 (e.g., ROM, EPROM, EEPROM, etc.), which BIOS stores the basic routines that help to transfer information between elements within the computer 1002, such as during start-up. The volatile memory 1012 can also include a high-speed RAM such as static RAM for caching data.

The computer 1002 further includes an internal hard disk drive (HDD) 1014 (e.g., EIDE, SATA), which internal HDD 1014 may also be configured for external use in a suitable chassis, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as a DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1012, including an operating system 1030, one or more application programs 1032, other program modules 1034, and program data 1036. The one or more application programs 1032, other program modules 1034, and program data 1036 can include the programming component 102, the recognition model build steps 104, the processors 202, the execution component 108, the recognition model actions 110, the compiler 204, the validation component 206, the detection component 208, the generator component 210, the interpreter component 212, and the build 500, for example.

All or portions of the operating system, applications, modules, and/or data can also be cached in the volatile memory 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, etc.

A monitor 1044 or other type of display device is also connected to the system bus 1008 via an interface, such as a video adaptor 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device for implementing a recognition model development system, comprising:
    a memory; and
    a processor coupled to the memory, the processor executing a plurality of components associated with the recognition model development system, wherein the components include:
        a programming component for defining recognition model build steps as declarations of processors and, input data and output data of the processors as dependencies of predecessor and subsequent process steps to form a declarative and data-dependent model build process; and
        an execution component for ordering and executing the steps based on the declarations to generate recognition model actions.

2. The computing device of claim 1, wherein the steps are arranged to have the input data available before execution.

3. The computing device of claim 1, further comprising a compiler for generating an initial model development graph having processors and pieces of data as nodes and dependencies as edges.

4. The computing device of claim 3, further comprising a validation component for validating the initial model graph for data dependencies for the processors.

5. The computing device of claim 1, wherein the execution component includes a generator component for generating an ordered list of the processors, each of the processors having input data available for execution.

6. The computing device of claim 5, further comprising an interpreter component for examining dates of the data and determining next processors for execution based on the dates.

7. A computing device for implementing a recognition model development system, comprising:
    a memory; and
    a processor coupled to the memory, the processor executing a plurality of components associated with the recognition model development system, wherein the components include:
        a programming component for defining speech recognition model build steps according to a declarative language, each step defined as a processor having a data dependency with predecessor and subsequent processors and an input/output mapping to form a declarative and data-dependent model build process;
        a generator component for generating an ordered list of processors where input data for each processor is available; and
        an execution component for executing the steps based on the ordered list of processors and generating speech recognition model actions.

8. The computing device of claim 7, further comprising a compiler for generating an initial model development graph having processors as nodes and dependencies as edges, and a validation component for validating the initial model graph for data dependencies for the processors.

9. The computing device of claim 8, further comprising a detection component for detecting if the graph is cyclic.

10. The computing device of claim 7, further comprising a task wrapper for wrapping tools, executables and scripts into a compatible interface for activation by the execution component.

11. A computer-readable memory device with instructions stored thereon for executing a method of developing recognition models, the method comprising:
    authoring recognition model build steps declaratively as a task description, the steps each including data and a processor for obtaining the data, and having a data dependency with predecessor and subsequent processor;
    generating a model development process graph of processor input data and output data based on the task description;
    generating an ordered list of the steps for execution; and
    executing the ordered list of steps to output recognition model actions.

12. The computer-readable memory device of claim 11, wherein the recognition model is a speech recognition model.

13. The computer-readable memory device of claim 11, wherein the method further comprises generating a predecessor step for each of the steps based on the task description.

14. The computer-readable memory device of claim 11, wherein the method further comprises validating consistency of each step based on the task description.

15. The computer-readable memory device of claim 11, wherein the method further comprises verifying that the input data for each processor is available for processor execution.

16. The computer-readable memory device of claim 11, wherein the method further comprises generating a list of potential output data for one or more processors based on the input data.

17. The computer-readable memory device of claim 11, wherein the method further comprises generating a list of potential input data for one or more processors based on the output data.

18. The computer-readable memory device of claim 11, wherein the method further comprises automatically programming order of execution of the steps based on data dependencies defined in the task description.

19. The computer-readable memory device of claim 11, wherein the method further comprises implementing a development process by changing declarations for a predefined set of steps in the task description and executing the predefined set of the steps.

20. The computer-readable memory device of claim 11, wherein the method further comprises adding one or more new processors in the form of new declarations in the task description without recoding or retesting.

* * * * *